US006595436B2

(12) United States Patent
Kirzhner et al.

(10) Patent No.: US 6,595,436 B2
(45) Date of Patent: Jul. 22, 2003

(54) PROPORTIONAL NEEDLE CONTROL INJECTOR

(75) Inventors: Joseph Kirzhner, Peoria, IL (US); Lester Peters, Columbus, IN (US); John D. Crofts, Edinburg, IN (US); Wayne Eckerle, Columbus, IN (US)

(73) Assignee: Cummins Engine Company, Inc., Columbus, OH (US)

( * ) Notice: Subject to any disclaimer, the term of this patent is extended or adjusted under 35 U.S.C. 154(b) by 0 days.

(21) Appl. No.: 09/850,117

(22) Filed: May 8, 2001

(65) Prior Publication Data

US 2002/0166542 A1 Nov. 14, 2002

(51) Int. Cl.[7] ............................ B05B 1/08; F16K 31/44

(52) U.S. Cl. ...................... 239/102.2; 239/88; 239/584; 251/129.06; 251/231; 251/243

(58) Field of Search ........................... 239/102.1, 102.2, 239/88, 584, 533.2, 533.4, 585.1; 251/129.06, 229, 231, 236, 242, 243, 244; 123/447, 498

(56) References Cited

U.S. PATENT DOCUMENTS

| | | | | |
|---|---|---|---|---|
| 3,194,162 A | | 7/1965 | Williams | |
| 3,919,989 A | | 11/1975 | Jarrett et al. | |
| 4,022,166 A | | 5/1977 | Bart | |
| 4,101,076 A | | 7/1978 | Bart | |
| 4,593,658 A | | 6/1986 | Moloney | |
| 4,720,077 A | | 1/1988 | Minoura et al. | |
| 4,782,807 A | | 11/1988 | Takahashi | |
| 5,226,628 A | * | 7/1993 | Daly | 251/129.06 |
| 5,271,226 A | | 12/1993 | Stone | |
| 5,431,010 A | | 7/1995 | Stone | |
| 5,463,996 A | | 11/1995 | Maley et al. | |
| 5,551,398 A | | 9/1996 | Gibson et al. | |
| 5,630,550 A | | 5/1997 | Kurishige et al. | |
| 5,651,345 A | | 7/1997 | Miller et al. | |
| 5,803,361 A | | 9/1998 | Horiuchi et al. | |
| 6,012,430 A | | 1/2000 | Cooke | |
| 6,021,760 A | | 2/2000 | Boecking | |
| 6,186,474 B1 | * | 2/2001 | Fitzner et al. | 251/229 |

FOREIGN PATENT DOCUMENTS

| | | |
|---|---|---|
| DE | 3039972 | 5/1982 |

* cited by examiner

*Primary Examiner*—Steven J. Ganey
(74) *Attorney, Agent, or Firm*—Nixon Peabody LLP; Tim L. Brackett, Jr.

(57) ABSTRACT

The fuel injector includes a solid state actuator that operates through an actuator motion amplifying lever to directly control the needle valve motion. Hydraulic forces, which act along the axes of the needle valve and the motion amplifying lever, are compensated by using a control piston, or other biasing means, to reduce the required amplitude of the control current/voltage and to reduce the required strength of the spring biasing the needle valve closed. The fuel injector may also include a control fuel inlet that is separate from the injection fuel inlet port.

50 Claims, 11 Drawing Sheets

PROPORTIONAL NEEDLE CONTROL INJECTOR

BACKGROUND OF THE INVENTION

1. Field of the Invention

This invention relates generally to fluid injectors. More particularly, this invention relates to a proportional needle control fuel injector having a piezoelectric actuator and an actuator motion amplifying lever.

2. Description of Related Art

Accurate control of fuel injection rate shape requires accurate control of the injector needle valve motion. Highly accurate electronic control of an injector needle valve motion may be provided by using solid state actuators such as piezoelectric, electro-strictive, or magneto-strictive actuators to control the needle valve position. To provide a desired valve displacement, conventional solid state actuators require high values of applied current and/or voltage.

In an attempt to reduce the magnitude of the applied control current and/or voltage to the solid state actuators, and dimensions of the actuator, some fuel injectors include mechanical or hydraulic motion amplifiers. The use of a hydraulic amplifier requires that some fuel must be wasted to control the amplification. Hydraulic amplifier's also allow undesirable oscillations of the controlled motion parts A piezoelectric actuator stack is advantageous in that a piezoelectric actuator reacts approximately five to ten times faster than a solenoid controlled injector. Additionally, the amount of extension of the piezoelectric actuator is directly proportional to the amplitude of the control current/voltage, applied to the piezoelectric actuator. A proposed actuator with a lever system is also beneficial in that the injected fuel may be accurately controlled without the use of a spill valve circuit. Conventional spill valves maintain a desired pressure within a fuel injector by bleeding off fuel from the fuel passageway when the pressure within the fuel passageway exceeds a predetermined amount. The fuel that is spilled either returns to the fuel supply or is wasted. A spill valve circuit needle control system is inherently inefficient in that the energy that is used to pressurize the fuel is wasted when it is spilled from the fuel system. In addition to the energy expended in increasing the pressure of fuel, energy may also be expended in heating the fuel and this heat may also be lost in a spill valve circuit.

Solid state actuators provide such an accurate degree of needle positioning that variable geometry atomizing orifices may be effectively used. Variable geometry atomizing orifices enable high quality atomization for all operation conditions of the engine, and accurate control over the amount and rate of fuel being injected.

SUMMARY OF THE INVENTION

It is an object of the present invention to overcome the disadvantages of the prior art and to provide a proportional needle control injector that compensates for changes in fuel pressure.

It is another object of the present invention to provide a proportional needle control injector that compensates for changes in friction forces.

It is another object of the present invention to provide a proportional needle control injector that compensates for wearing.

It is yet another object of the present invention to provide a proportional needle control injector that compensates for manufacturing tolerances.

It is a further object of the present invention to provide a proportional needle control injector that improves injection rate shape control.

It is a still further object of the present invention to provide a proportional needle control injector with reduced requirements to control current and/or voltage.

It is still another object of the present invention to provide a proportional needle control injector that does not require a control flow.

It is yet another object of the present invention to provide a proportional needle control injector that saves deficit radial space.

It is another object of the present invention to provide a proportional needle control injector that is hydraulically compensated such that the amplitude of the control current/voltage to the actuator may be reduced and the strength of a spring biasing the needle valve closed may also be reduced.

These and other objects of the present invention are achieved by providing an injector body including an injection fuel inlet port, an injection fuel outlet port and a control fuel inlet port. The injector also includes a solid state actuator housed within the injector body, an actuator amplifying lever housed within the injector body and a needle valve housed within the injector body. The needle valve being moveable between a first position closing the injection fuel outlet port and a second position to open the injection fuel outlet port. The actuator amplifying lever is responsive to a dimensional change of the solid state actuator to permit movement of the needle valve from the first position to the second position. The distance between the first and second positions (needle valve travel/lift) is proportional to the applied voltage/current.

These and other objects of the present invention may also be achieved by providing a fuel injector having an injector body that includes an injection fuel inlet port and an injection fuel outlet port. The injector also includes within an injector body: a solid state actuator, an actuator amplifying lever, a control piston and a needle valve. The control piston is housed within a control fluid chamber within the injector body which is in fuel communication with the injection fuel inlet port and the injection fuel outlet port. The needle valve is moveable between a first position closing the injection fuel outlet port and a second position to open to injection fuel outlet port. The actuator amplifying lever is responsive to a dimensional change of the solid state actuator to permit movement of the needle valve from the first position to the second position.

These and other objects of the present invention may also be achieved by providing a fuel injector having an injector body that includes an injection fluid inlet port and an injection fluid outlet port. The injector body houses a solid state actuator, a needle valve, a biasing means and an actuator amplifying lever. The needle valve is moveable between a first position closing the injection fluid outlet port and a second position to open the injection fluid outlet port. The biasing means biases the needle valve toward the first position. The actuator amplifying lever is positioned between the biasing means and the needle valve and is responsive to a dimensional change of the solid state actuator to permit movement of the needle valve from the first position to the second position.

One exemplary embodiment of the present invention provides hydraulic compensation for clearances between the solid state actuator and the needle valve. This embodiment uses a fuel that compensates for wear and manufacturing tolerances.

In another exemplary embodiment of the present invention the amplitude of the required current and/or voltage for the solid state actuator may be reduced by using a separate control channel to control forces acting at the top of a control piston linked to a needle valve.

Yet another exemplary embodiment of the present invention may use a pusher pin to contact an amplifying lever and to minimize the size of the fuel injector.

An additional exemplary embodiment may include a mechanical amplifying lever for the solid state actuator that engages an integral needle valve and control piston.

BRIEF DESCRIPTION OF THE DRAWINGS

The exemplary embodiments of this invention will be described in detail, with reference to the following figures, wherein.

DETAILED DESCRIPTION OF EXEMPLARY EMBODIMENTS

Figure 1:
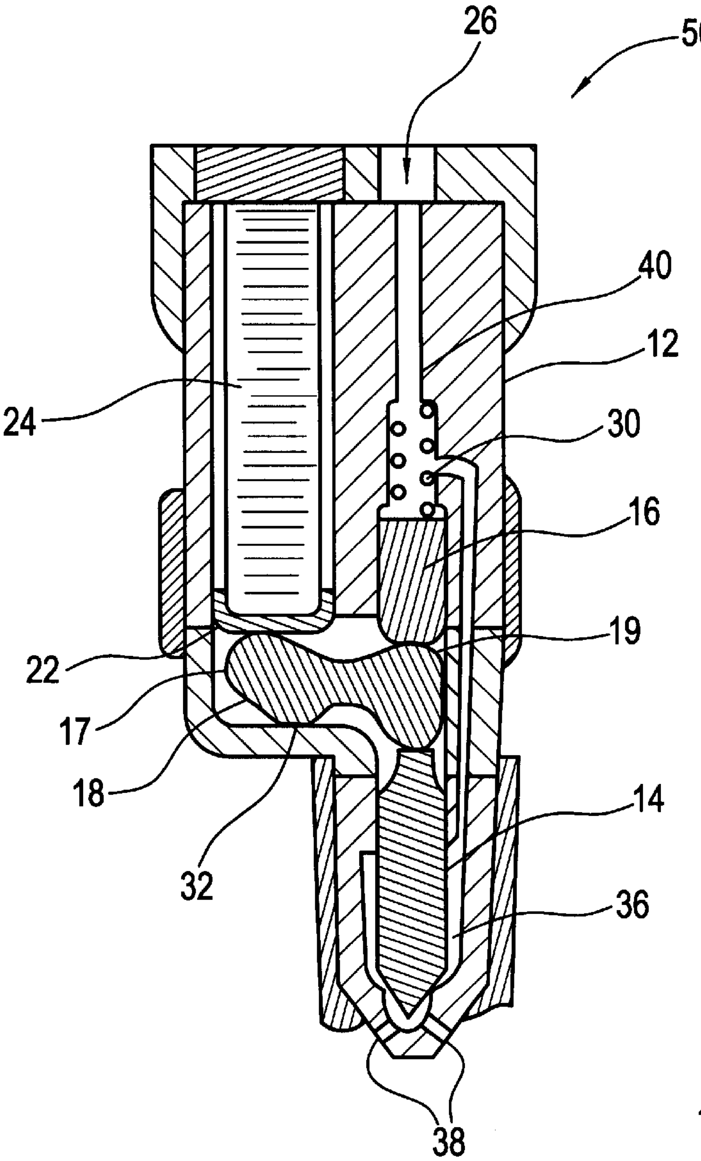
FIG. 1 shows a cross-sectional view of a first exemplary embodiment of a fuel injector in accordance with the invention.

FIG. 1 shows a first exemplary embodiment of the fuel injector 50 in accordance with the invention. The fuel injector 50 includes an injector body 12, which houses a needle valve 14, a control piston 16, an actuator amplifying lever 18, an actuator guide 22, a solid state actuator 24 and a control piston spring 30. The injector body 12 also includes a common injection fuel inlet port 26 that communicates with both a nozzle needle chamber 36 and a control chamber 40. In this manner, the pressures in the nozzle needle chamber 36 that tend to lift the needle valve 14 are offset by the identical pressure in the control chamber 40 pushing downward upon the control piston 16.

The fuel injector 50 includes two separate controls. The first control for the fuel injector 10 is the solid state actuator 24. The solid state actuator 24 is connected to electrodes (not shown) and may be a piezoelectric, electro-strictive or magneto-strictive, but in the preferred embodiment the solid state actuator 24 is a piezoelectric actuator. The voltage potential across these electrodes determines the length of the solid state actuator 24 and the length of the solid state actuator 24 may be very accurately controlled by controlling this potential. One end of the solid state actuator 24 is received by an actuator guide 22 which transfers the motion of the end of the solid state actuator 24 to a first end of an actuator amplifying lever 18. The actuator amplifying lever 18 has a pivot point 32 about which the actuator amplifying lever 18 pivots. A second end of the actuator amplifying lever 18 is in compressive abutment between a control piston 16 and a needle valve 14, which are positioned above and below the actuator amplifying lever 18, respectively. Thus, as the solid state actuator 24 changes in length, the actuator guide 22 will move longitudinally against a first end 17 of the actuator amplifying lever 18. In response, the actuator amplifying lever 18 pivots about pivot point 32 and moves the opposite second end 19 of the actuator amplifying lever 18 which, in turn, moves the control piston 16 and the needle valve 14. For example, a control signal may be applied across the electrodes of the solid state actuator 24 to lengthen the solid state actuator 24 to cause the guide 22 to move downward in FIG. 1. As the actuator guide 22 moves downward, the actuator amplifying lever 18 pivots in a counter-clockwise direction about the pivot point 32 and forces the control piston 16 upward and allows the needle valve 14 to rise. The needle valve 14 rises off of the valve seat 34 because the fuel pressure in the nozzle needle chamber 36 pushes upwards on the needle valve 14. Fuel then escapes out of the injection fuel outlet ports 38.

Both the control piston spring 30 and the control fuel within the control chamber 40 operate to bias the control piston 16 toward the actuator amplifying lever 18. In the instance where the fuel injector is for an internal combustion engine, at engine start-up, the fuel may not have sufficient pressure to bias the control piston 16 against the actuator amplifying lever 18 to compensate for wear and tolerances. The control piston spring 30 biases the control piston 16 and compensates for the wear and manufacturing tolerances.

As the fuel injector 50 operates, contact points between the actuator guide 22, the actuator amplifying lever 18, the control piston 16 and needle valve 14 wear. For accurate control of the needle valve 14, this wear must be compensated in some manner. Additionally the manufacturing tolerances of the fuel injector 50 may cause gaps between the guide 22, the actuator amplifying lever 18, the control piston 16 and needle valve 14. The fuel injector 50 includes the control piston spring 30 that compensates for the wear and tolerances of the fuel injector 50. During normal engine operation, once the fuel pressure has achieved an operational level, the hydraulic compensation provided by the high pressure fuel provides the forces necessary to compensate for wear and tolerances. Since the function of the control piston spring 30 is backed up by the hydraulic compensation, the control piston spring 30 is not required to be as strong as would otherwise be necessary in a fuel injector without hydraulic compensation. Therefore, the hydraulic compensation in accordance with this embodiment of the invention reduces the spring cost and, thus, the overall cost of the fuel injector. The hydraulic compensation also makes it feasible for an injector to operated at high fuel pressures, such as at 200 MPa and above.

Figure 2:
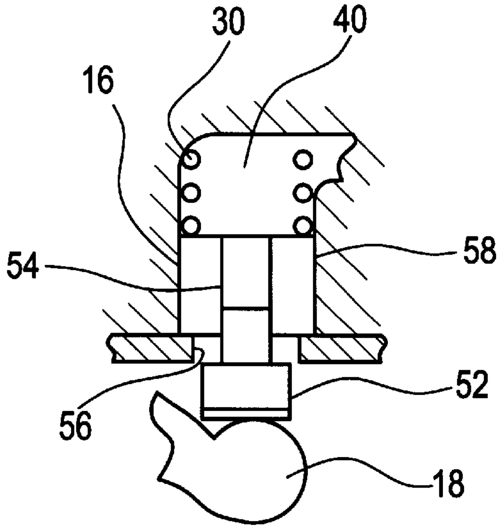
FIG. 2 is a detailed view of an alternative embodiment for a control piston that can be used with the invention.

FIG. 2 shows an optional modification of the control piston 16. The control piston 16 may include a control plunger 52 that contacts the actuator amplifying lever 18. The control plunger 52 is received in a plunger bore 54 within the control piston 16 such that the control plunger 52 may move axially within the plunger bore 54. The amount by which the control plunger 52 extends out of the plunger bore 54 depends upon the pressure of the fuel within the control chamber 40. The control piston spring 30 biases the control piston 16 against a ledge 56 which acts to stop the control piston 16 from extending out of a control piston bore 58 that receives the control piston 16. In this manner, the pressure of the fuel in the control chamber 40 may reduce the required amplitude of the voltage and/or the current that is applied to the solid state actuator 24 to initiate movement of the needle valve 14, and increase the velocity of the returning stroke of the needle valve.

Figure 3:
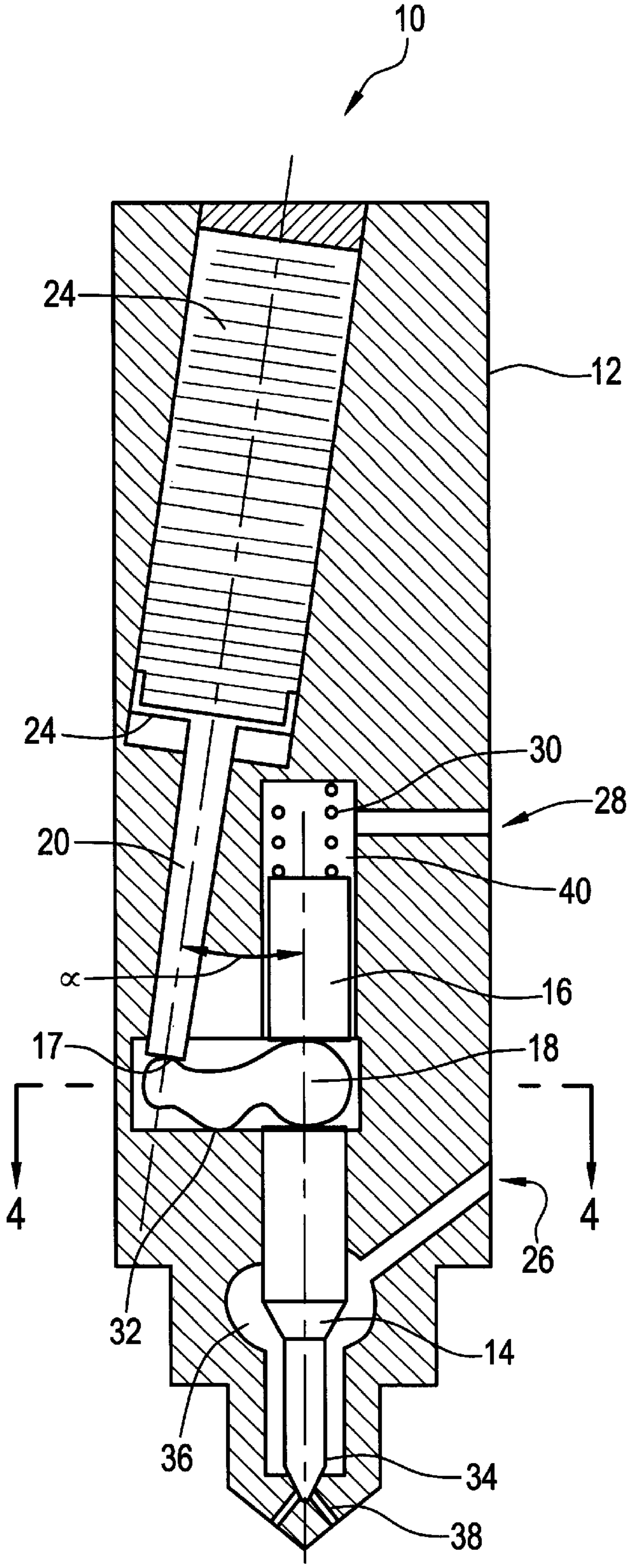
FIG. 3 is a cross-sectional view of a second exemplary embodiment of a fuel injector in accordance with the invention.
Figure 4:
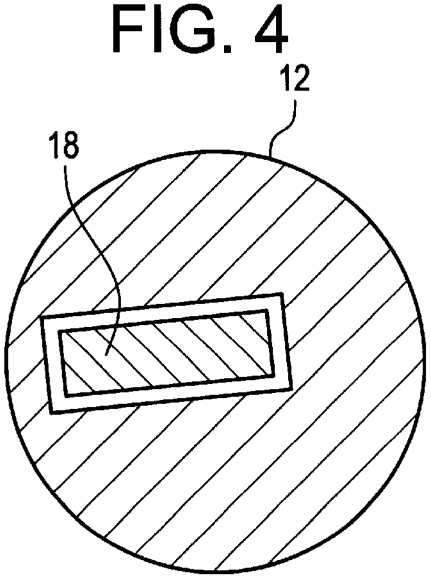
FIG. 4 is a cross-sectional view taken along line IV—IV of FIG. 3.

FIG. 3 shows a cross-sectional view of a second exemplary embodiment of a fuel injector 10 in accordance with the invention. The fuel injector 10 is similar to the first exemplary embodiment shown in FIG. 1, however the second exemplary embodiment includes a pusher pin 20 connecting the actuator guide 22 with the actuator amplifying lever 18. Additionally, the second exemplary embodiment does not include a common fuel inlet port 26.

The pusher pin 20 enables the solid state actuator 24 to be located a distance away from the actuator amplifying lever 18 and, as shown in FIG. 3, above the control chamber 40. In this manner, the width of the fuel injector 10 may be reduced. As shown in FIG. 3, the angle $\alpha$ between the longitudinal axis of the solid state actuator 24 and the needle valve 14 is acute.

Figure 5:
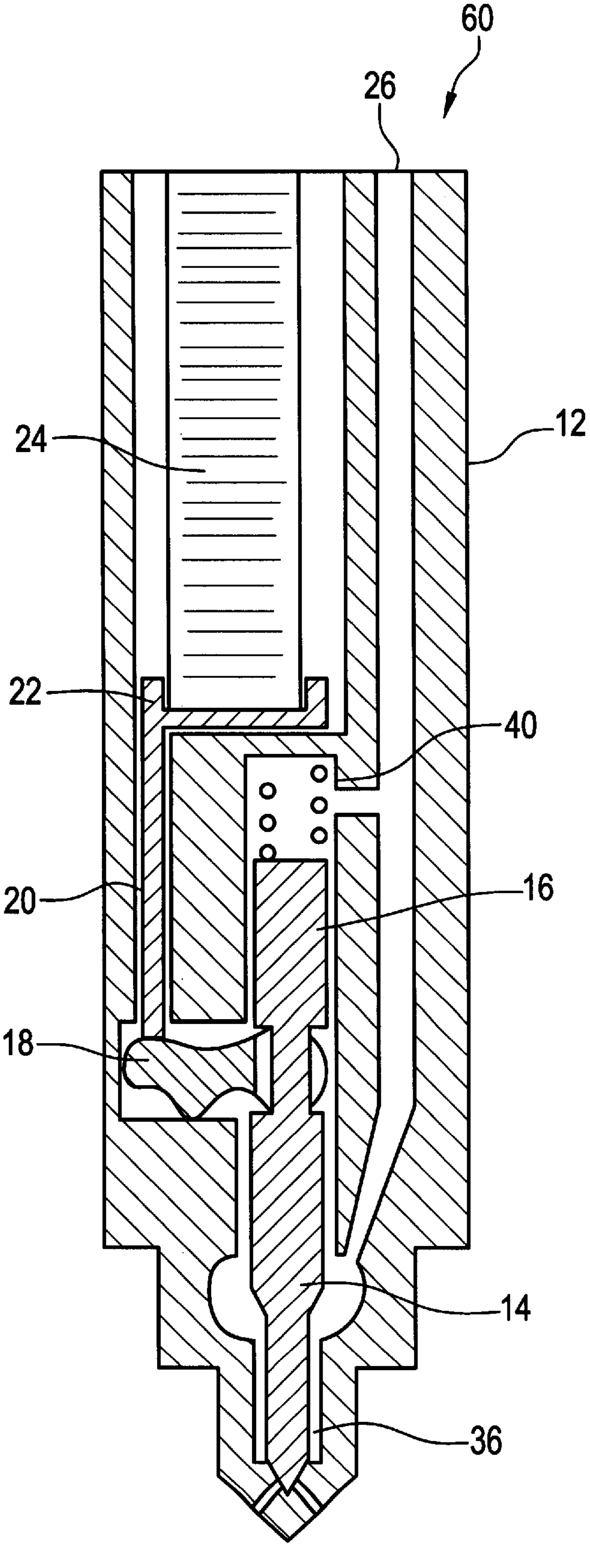
FIG. 5 is a cross-sectional view of a third exemplary embodiment of a fuel injector in accordance with the invention.

FIG. 5 shows a cross-sectional view of a third exemplary embodiment of a fuel injector 60 in accordance with the invention. The fuel injector 60 is similar to the second exemplary fuel injector 10 in that it includes a pusher pin 20 and is similar to the first exemplary fuel injector 50 in that the injection fuel communicates with both the control chamber 40 and the nozzle needle chamber 36. The fuel injector in FIG. 5, however, includes a pusher pin 20 which is offset from the central longitudinal axis of the actuator guide 22 such that the longitudinal axis of the solid state actuator 24 may be substantially parallel to the longitudinal axis of the needle valve 14 and control piston 16 and still maintain a reduced packaging size.

Figure 6:
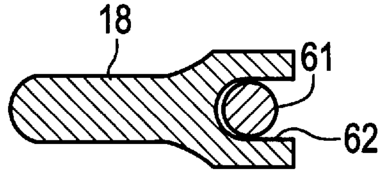
FIG. 6 is a cross-sectional view of an actuator and amplifier lever of the fuel injector of FIG. 5 taken along lines VI—VI.

Additionally, the fuel injector 60 differs from previous exemplary embodiments in that the needle valve 14 and control piston 16 are coupled and, in this case, are integral. As shown in FIG. 6, the integral needle valve 14 and control piston 16 are connected with a shaft 61 which interacts with a groove 62 in the actuator amplifying lever 18.

Figure 7:
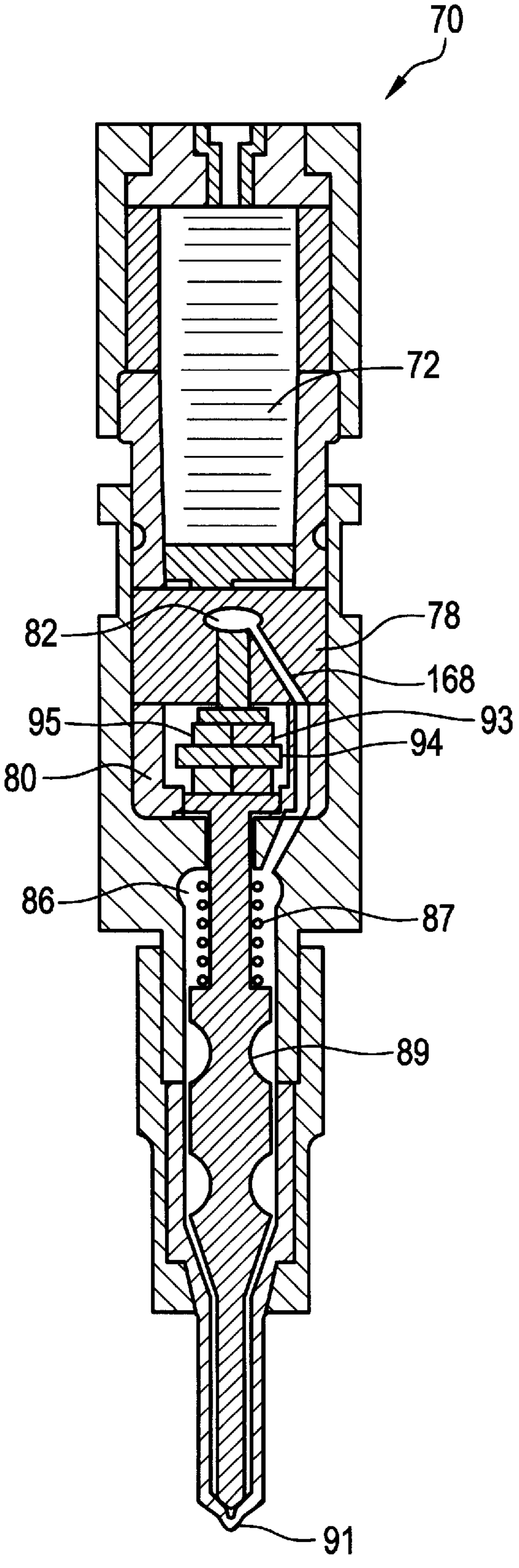
FIG. 7 is a cross-sectional view of a fourth exemplary embodiment of a fuel injector in accordance with the invention.
Figure 8:
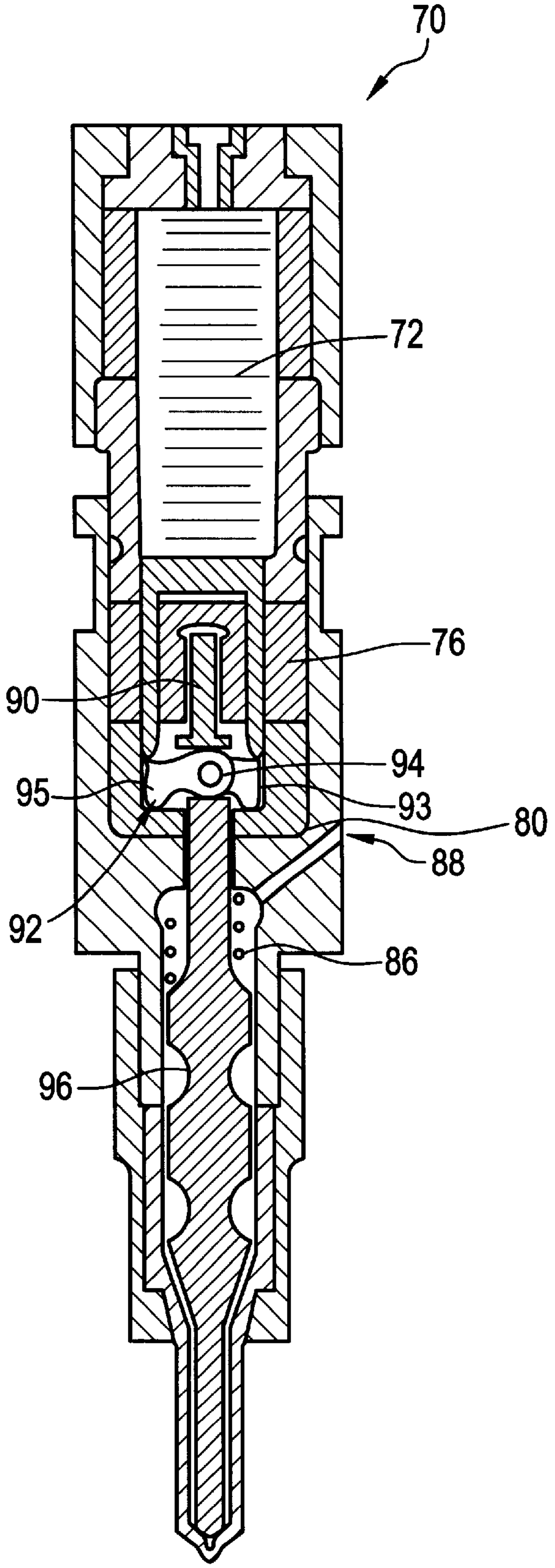
FIG. 8 is a second cross-sectional view of the fuel injector of FIG. 7.

FIGS. 7 and 8 are cross-sectional drawings of a fourth exemplary fuel injector 70 in accordance with the invention. FIGS. 7 and 8 show cross-sections of the fuel injector 70 taken perpendicular to each other. In this fourth exemplary fuel injector 70, the central longitudinal axis of the solid state actuator stack 72 is substantially aligned with the central longitudinal axis of the needle valve 89.

FIG. 8 shows the solid state actuator stack 72 in contact with a pusher 74 which includes legs 76 that extend through a plunger housing 78. The plunger housing 78 abuts a lever base 80. As can be seen in FIG. 7, the plunger housing 78 includes control chamber 82 that is in fuel communication through the lever base 80 and injector body 84 with the nozzle needle chamber 86. The nozzle needle chamber 86 also houses a needle bias spring 87, which biases the needle valve 89 to a position which closes orifices 91 of the injector 70. FIG. 8 shows the injection fuel inlet 88 in communication with the nozzle needle chamber 86. In this manner, the pressures in the nozzle needle chamber 86 and the control chamber 82 are equalized.

As shown in FIG. 8, the plunger housing 78 receives the plunger 90 which contacts an actuator amplifying lever 92 that includes a first lever arm 93 and a second lever arm 95 that are connected to each other by an axle 94 which passes through each of the pair of lever arms 93 and 95. The actuator amplifying lever 92 also contacts a needle valve 96. Each leg 76 of the pusher 74 contacts one of the pair of lever arms 93 and 95 at the opposite end of the actuator amplifying lever 92. In this manner, when the solid state actuator stack 72 lengthens, the stack 72 pushes downward upon the pusher 74 which, in turn, pushes down on the outer ends of the actuator amplifying lever 92. In response, the lever arms 93 and 95 pivot and lift along the central longitudinal axis of the injector 70 while each of the pair of lever arms 93 and 95 rotate about the axle 94. The axle 94 insures that each of the pair of lever arms 93 and 95 operate together. Additionally, the axle 94 serves to horizontally position the pair of lever arms 93 and 95 within the lever base 80.

Figure 9:
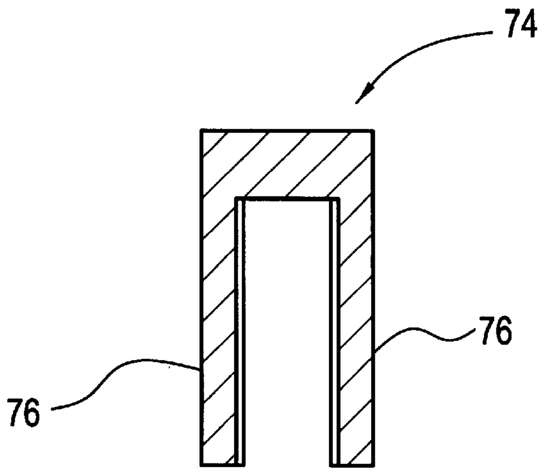
FIG. 9 is a cross-sectional view of the actuator pusher of the fuel injector of FIGS. 7 and 8.
Figure 10:
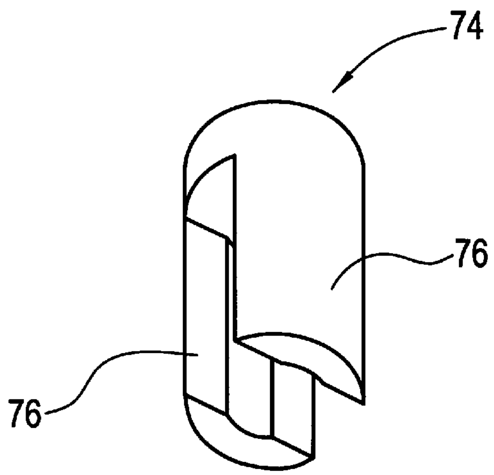
FIG. 10 is a perspective view of the actuator pusher of FIG. 9.

FIGS. 9 and 10 show the actuator pusher 74 of the fourth exemplary embodiment of the fuel injector 70. The pusher 74 includes a pair of pusher legs 76.

Figure 11:
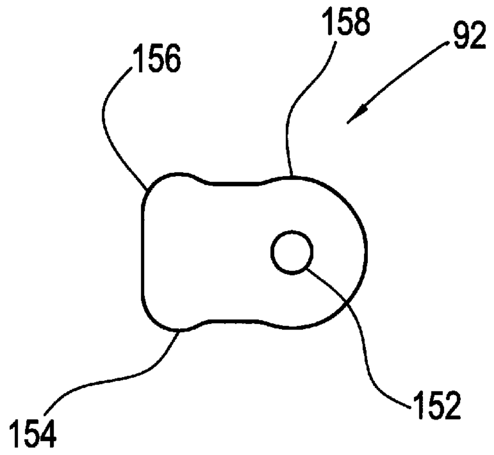
FIG. 11 is an elevation view of the lever arm of the fuel injector of FIG. 7.
Figure 12:
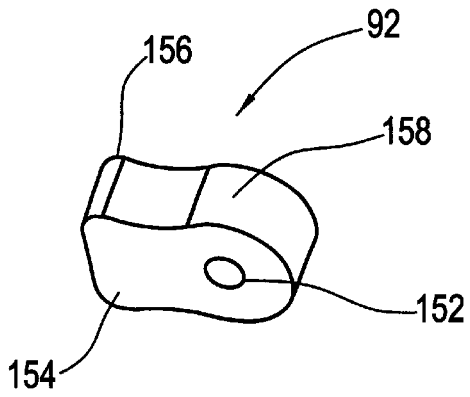
FIG. 12 is a perspective view of the lever arm of FIG. 11.

FIGS. 11 and 12 show an elevation view and a perspective view, respectively, of one lever arm 92 of the fourth exemplary embodiment. The lever arm 92 includes an axle bore 152, a pivot point 154, a first end 156 for contacting the lower surface of the pusher legs 76 and a second end surface 158 for contacting the plunger 90.

Figure 13:
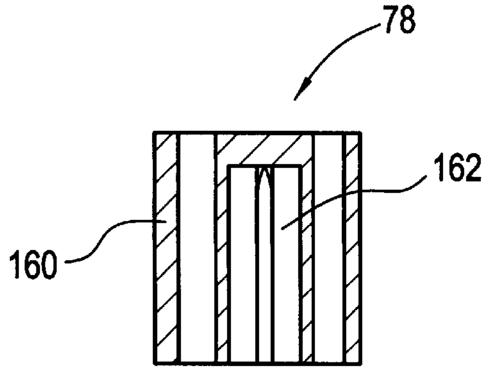
FIG. 13 is a first cross-sectional view of the plunger housing of the fuel injector of FIG. 7.
Figure 14:
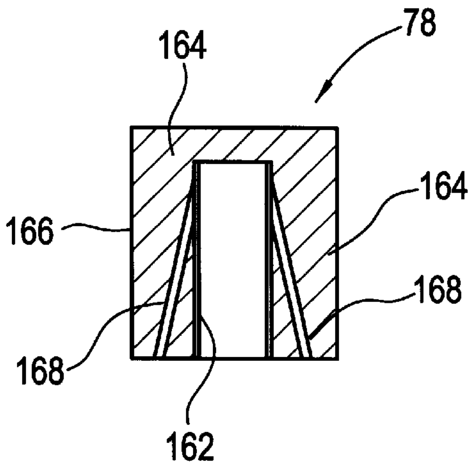
FIG. 14 is a second cross-sectional view of the plunger housing of FIG. 13.
Figure 15:
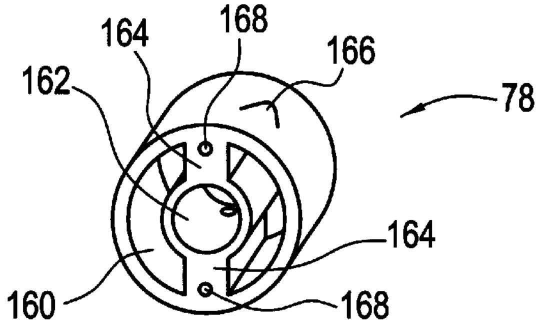
FIG. 15 is a perspective view of the plunger housing of FIG. 13.

FIGS. 13–15 show detail views of the plunger housing 78 of the fourth exemplary embodiment of the fuel injector 70. As shown in FIG. 13, the plunger housing 78 includes pusher leg receiving bores 160 that enable the pusher legs 76 of the pusher 74 to pass through the plunger housing 78 and to establish contact with a lever 92. The plunger housing 78 also includes a plunger receiving bore 162. The plunger housing 78 also includes webs 164 which extend from the plunger receiving bore 162 to the outer radial surface 166 of the plunger housing 78. Each web 164 includes a fuel communication passageway 168.

Figure 16:
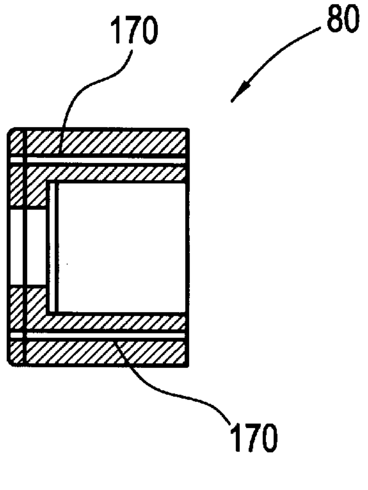
FIG. 16 is a cross-sectional view of the lever base of the fuel injector of FIG. 7.
Figure 17:
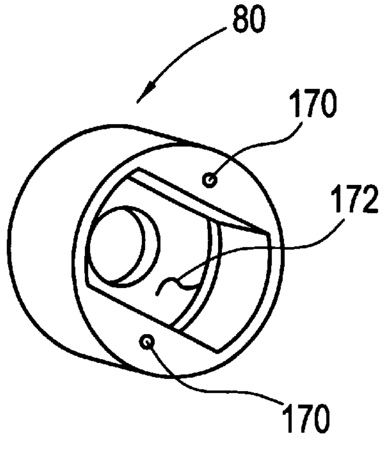
FIG. 17 is a perspective view of the lever base of FIG. 16.

FIGS. 16 and 17 show a detail view of the lever base 80 of the fourth exemplary embodiment of the fuel injector 70. The lever base 80 includes fuel communication passageways 170. The lever base 80 is installed in the fuel injector 70 with the plunger housing 78. The fuel communication passageway 170 communicates directly with the fuel communication passageway 168 of the plunger housing 70. In this manner, fuel communication is established between the control chamber 82 within the plunger receiving bore 162 and the nozzle needle chamber 36. The lever base 80 also includes lever supporting surfaces 172 which establish contact with the pivot point 154 of each lever arm 92.

Figure 18:
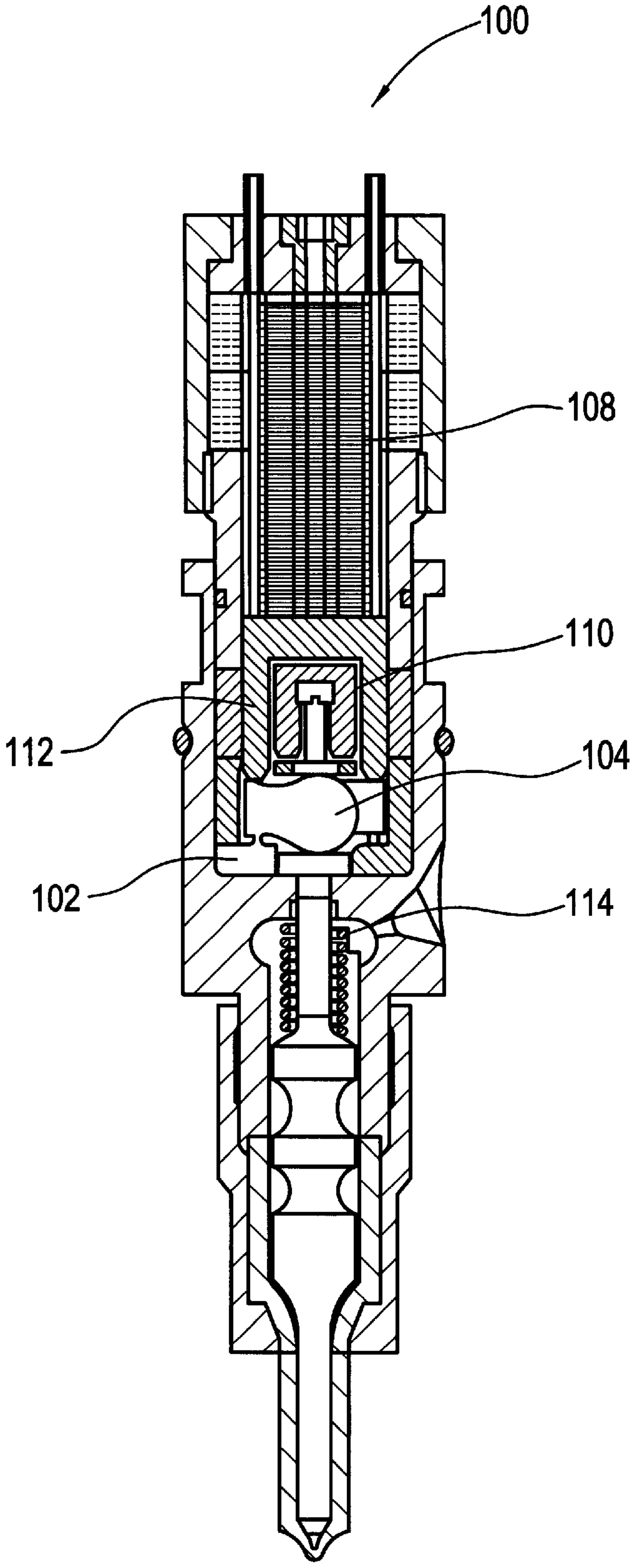
FIG. 18 is a cross-sectional view of a fifth exemplary embodiment of a fuel injector in accordance with the invention.
Figure 19:
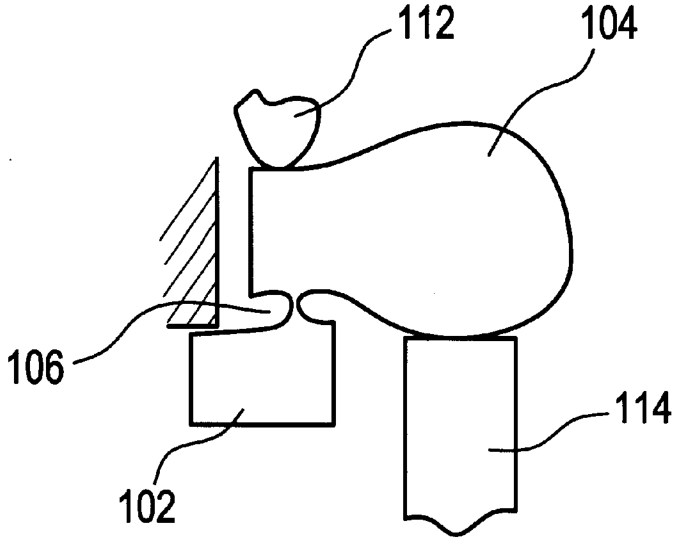
FIG. 19 is a detail view of the integral actuator amplifying lever and lever base of the fifth exemplary embodiment of the fuel injector of FIG. 18.

FIG. 18 shows a fifth exemplary embodiment of a fuel injector 100 in accordance with the invention. The fuel injector 100 is similar to the fourth exemplary embodiment shown in FIGS. 7 and 8, except that the lever base 102 and the pair of levers 104 form an integral part. FIG. 19 shows a detailed elevation view of the integral lever base 102 and lever 104 of the fifth exemplary embodiment. FIG. 19 also shows a detail view of the flexure fulcrum 106 that connects the lever 104 with the lever base 102. The flexure fulcrum 106 experiences compression and bending stresses during operation. When the solid state actuator stack 108 is activated, the stack lengthens and pushes the pusher 110 and the corresponding pusher leg 112 into one side of the lever 104. As the pusher leg 112 forces one end of the lever 104 downward, the lever 104 rotates counter-clockwise about the flexure fulcrum 106 and allows the needle valve 114 to rise.

Figure 20:
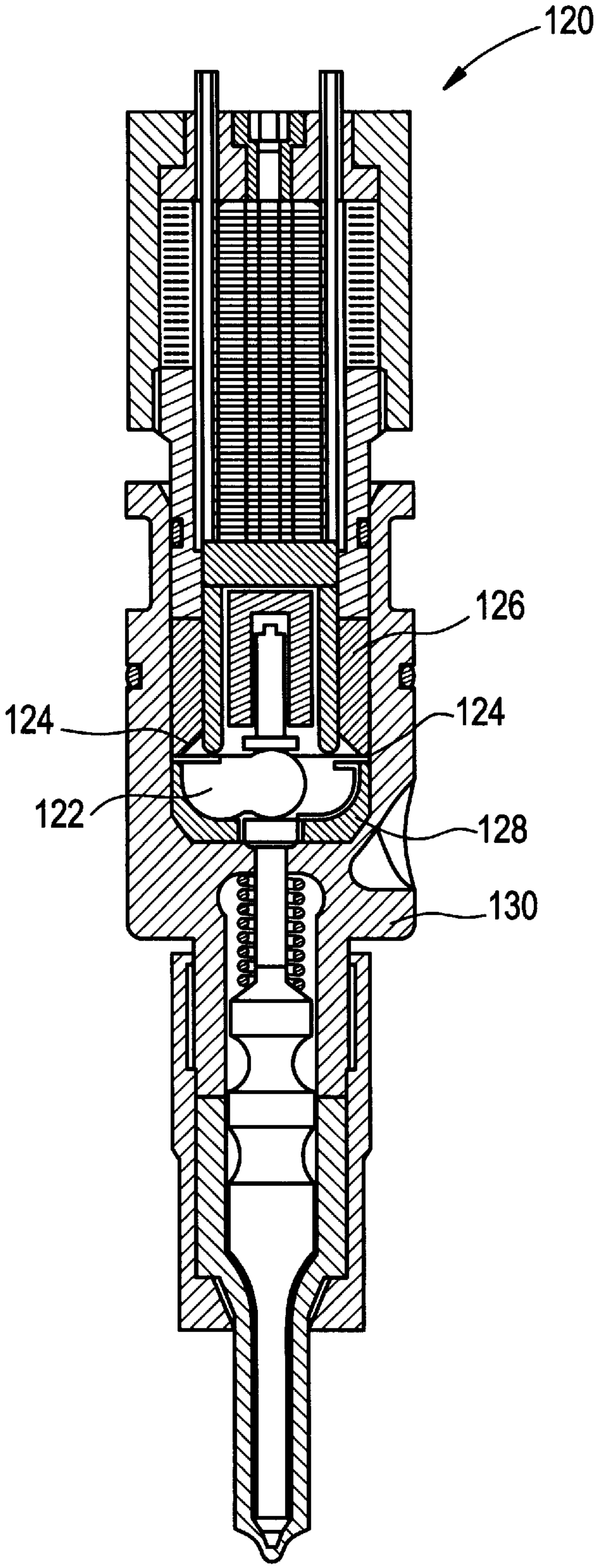
FIG. 20 is a cross-sectional view of a sixth exemplary embodiment of a fuel injector in accordance with the invention.

FIG. 20 shows a sixth exemplary embodiment of a fuel injector 120. The fuel injector 120 includes a pair of lever arms 122 that each include a shim 124 that is sandwiched between piston housing 126 and the lever base 128. The shims 124 also abut the injector body 130. The shims 124 operate to position each lever arm 122 horizontally within the injector body 130. The shims 124 are substantially flexible in the vertical axis and allow the lever arms 122 to rotate about their corresponding pivot points. However, each shim is substantially rigid in the horizontal direction to maintain the horizontal position of each corresponding lever arm 122 within the injector body 130.

Figure 21:
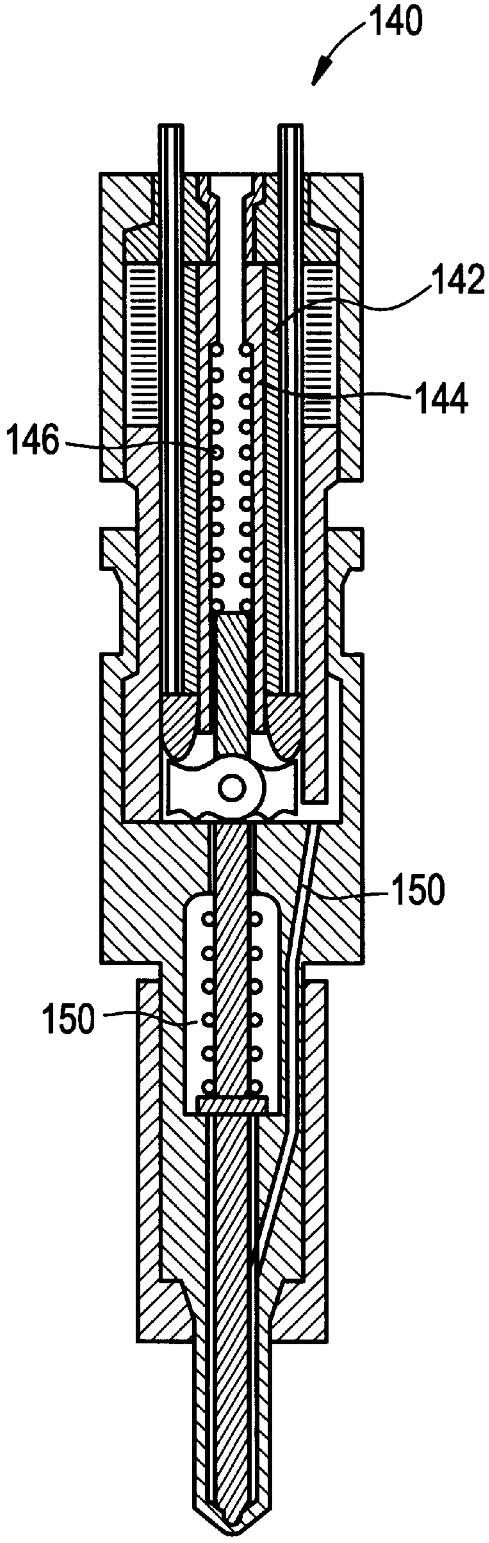
FIG. 21 is a cross-sectional view of a seventh exemplary embodiment of a fuel injector in accordance with the invention.

FIG. 21 shows a seventh exemplary embodiment of a fuel injector 140 in accordance with the invention. The fuel injector 140 includes a cylindrical solid state stack 142 which includes an internal bore 144 extending longitudinally through the solid state stack 142. The bore 144 forms a fuel supply passage 146. The fuel supply passage 146 is in fuel communication with the nozzle needle chamber 148 via a second fuel supply passage 150.

Figure 22:
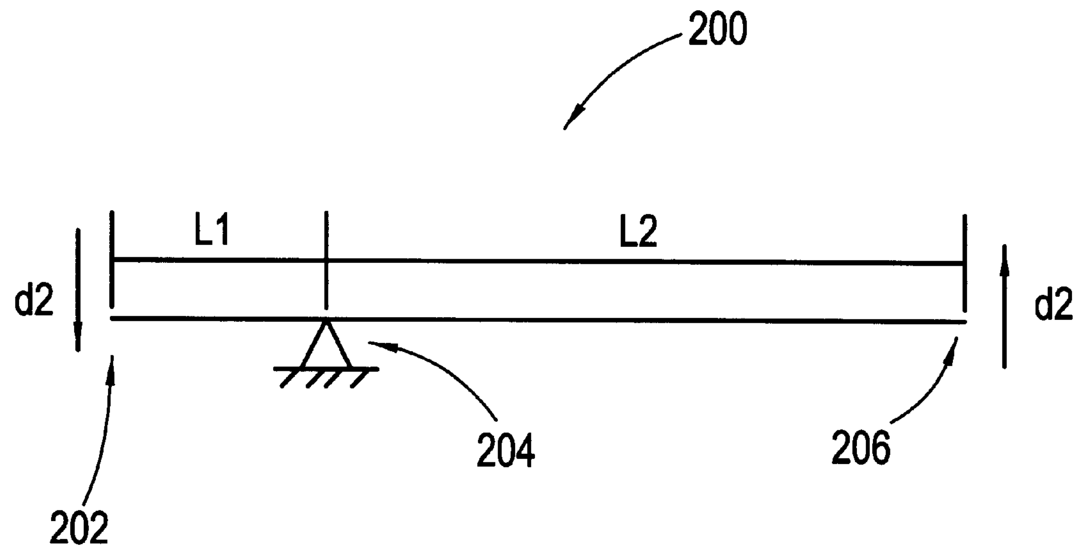
FIG. 22 is a schematic diagram of a simple lever.

FIG. 22 shows a simple lever for a mechanical amplifier. Mechanical amplifiers generally use a simple lever to amplify the motion of the actuator. The amplification of the motion is directly proportional to the ratio of the distance from the contact point of the needle valve with the lever to the pivot over the distance from the contact point of the actuator with the lever to the pivot. For example, referring to FIG. 22, a simple lever 200 is shown. The amount of amplification may be determined based upon the following equation:

$$d2=(d1\times L2)/L1 \qquad (1)$$

Where:

- L1 is the distance from the contact point 202 of the actuator with the lever to the pivot point 204;
- L2 is the distance from the contact point 206 of the needle valve with the lever to the pivot point 204;
- d1 is the vertical distance that the actuator moves; and
- d2 is the vertical distance that the needle valve is moved by the amplifier.

The amount of amplification may be adjusted by changing the ration L2/L1.

It is to be understood that while the above described embodiments have been described as being a fuel delivery system, that the invention may also be used to deliver any type of fluid.

While this invention has been described in conjunction with the specific embodiments outlined above, it is evident that many alternatives, modifications and variations are apparent to those skilled in the art. Accordingly, the exemplary embodiments of the invention as set forth above are intended to be illustrative and not limiting. Various changes may be made without departing from the spirit and scope of the invention.

What is claimed is:

1. A fluid injector comprising:
   - an injector body including an injection fluid inlet port, an injection fluid outlet port, a control fluid inlet port and a control fluid chamber in fluid communication with the control fluid inlet port;
   - a solid state actuator housed within the injector body;
   - an actuator amplifying lever housed within the injector body; and
   - a needle valve housed within the injector body and moveable between a first position closing the injection fluid outlet port and a second position to open the injection fluid outlet port, wherein the actuator amplifying lever is mechanically linked to said needle valve and responsive to a dimensional change of the solid state actuator to permit movement of the needle valve from the first position to the second position.

2. The injector of claim 1, wherein the actuator amplifying lever comprises a first lever and a second lever positioned adjacent one another and mounted for pivotal movement about respective pivot points.

3. The injector of claim 2, wherein the pivot point of the first lever is positioned a spaced distance apart from the pivot point of the second lever, the respective pivot points positioned on opposite sides of the injector body.

4. The injector of claim 2, wherein each of the first and second levers further include a shim on the first end radially positioning each lever within the injector body.

5. The injector of claim 2, wherein each of the first and second levers have a first end for receiving a force from the solid state actuator and including an axle receiving bore at a second end, wherein each of the first and second levers also have a second end which is for transmitting a force to the needle valve, wherein the injector further comprises an axle extending through axle receiving bores of each of the first lever and the second lever, and wherein the axle extends through the central longitudinal axis of the injector body.

6. The injector of claim 1, further comprising a lever base housed within the injector body, wherein the lever base and the actuator amplifying lever are integral and connected by a flexure fulcrum.

7. The injector of claim 1, further comprising a pusher pin contacting the actuator amplifying lever and transmitting the dimensional change of the solid state actuator to the actuator amplifying lever, wherein the pusher pin is offset from and parallel to the longitudinal axis of the solid state actuator and wherein the angle between the longitudinal axis of the solid state actuator and the needle valve is acute.

8. The injector of claim 1, further comprising:
   - a control piston positioned in a control fluid chamber housed within the injector body; and
   - a biasing means for biasing the control piston toward the actuator amplifying lever.

9. The injector of claim 8, wherein the actuator amplifying lever is positioned in compressive abutment between the needle valve and the control piston.

10. The injector of claim 8, wherein the control piston and needle valve are connected by a shaft and wherein the actuator amplifying lever includes a groove that receives the shaft.

11. The injector of claim 1, further comprising:

a pusher extending from the solid state actuator to one end of the actuator amplifying lever;

a plunger housing within the injector body which includes:

a plunger bore; and a pusher leg receiving bore; and a plunger axially moveable within the plunger bore and in contact with the actuator amplifying lever, wherein the pusher includes a pusher leg extending through the pusher leg receiving bore to establish contact with the actuator amplifying lever.

12. The injector of claim 1, wherein the longitudinal axis of the solid state actuator is substantially aligned with the axis of the needle valve.

13. The injector of claim 1, wherein the solid state actuator includes a longitudinally extending internal bore which is in fluid communication with the injection fluid inlet port.

14. A fluid injector comprising:

an injector body including an injection fluid inlet port, an injection fluid outlet port and a control fluid chamber in fluid communication with the injection fluid inlet port and the injection fluid outlet port;

a solid state actuator housed within the injector body;

an actuator amplifying lever housed within the injector body a control piston positioned adjacent the control fluid chamber within the injector body; and a needle valve housed within the injector body and moveable between a first position closing the injection fluid outlet port and a second position to open the injection fluid outlet port, wherein the actuator amplifying lever is responsive to a dimensional change of the solid state actuator to permit movement of the needle valve from the first position to the second position.

15. The injector of claim 14, wherein the actuator amplifying lever comprises a first lever and a second lever positioned adjacent one another and mounted for pivotal movement about respective pivot points.

16. The injector of claim 15, wherein the pivot point of the first lever is positioned a spaced distance apart from the pivot point of the second lever, the respective pivot points positioned on opposite sides of the injector body.

17. The injector of claim 15, wherein each of the first and second levers further include a shim on the first end radially positioning each lever within the injector body.

18. The injector of claim 15, wherein each of the first and second levers have a first end for receiving a force from the solid state actuator and including an axle receiving bore at a second end, wherein each of the first and second levers also have a second end which is for transmitting a force to the needle valve, wherein the injector further comprises an axle extending through axle receiving bores of each of the first lever and the second lever, and wherein the axle extends through the central longitudinal axis of the injector body.

19. The injector of claim 14, further comprising a lever base housed within the injector body, wherein the lever base and the actuator amplifying lever are integral and connected by a flexure fulcrum.

20. The injector of claim 14, further comprising a pusher pin contacting the actuator amplifying lever and transmitting the dimensional change of the solid state actuator to the actuator amplifying lever, wherein the pusher pin is offset from and parallel to the longitudinal axis of the solid state actuator and wherein the angle between the longitudinal axis of the solid state actuator and the needle valve is acute.

21. The injector of claim 14, further comprising a biasing means for biasing the control piston toward the actuator amplifying lever.

22. The injector of claim 14, wherein the actuator amplifying lever is positioned in compressive abutment between the needle valve and the control piston.

23. The injector of claim 14, wherein the control piston and needle valve are connected by a shaft and wherein the actuator amplifying lever includes a groove that receives the shaft.

24. The injector of claim 14, further comprising:

a pusher extending from the solid state actuator to one end of the actuator amplifying lever;

a plunger housing within the injector body which includes:

a plunger bore; and a pusher leg receiving bore; and a plunger axially moveable within the plunger bore and in contact with the actuator amplifying lever, wherein the pusher includes a pusher leg extending through the pusher leg receiving bore to establish contact with the actuator amplifying lever.

25. The injector of claim 24, further comprising a lever base housed within the injector body and extending between the plunger housing and the needle valve, wherein the plunger housing includes a fluid communication passageway extending from the plunger bore through the plunger housing and the lever base into fluid communication with the injection fluid outlet port, and wherein the solid state actuator includes a longitudinally extending internal bore in fluid communication with the injection fluid inlet port.

26. The injector of claim 14, wherein the longitudinal axis of the solid state actuator is substantially aligned with the axis of the needle valve.

27. A fluid injector comprising:

an injector body including an injection fluid inlet port, an injection fluid outlet port and having a central longitudinal axis;

a solid state actuator housed within the injector body;

a needle valve housed within the injector body and moveable between a first position closing the injection fluid outlet port and a second position to open the injection fluid outlet port;

a biasing means positioned along the central longitudinal axis for biasing the needle valve toward the first position; and an actuator amplifying lever housed within the injector body and positioned along the central longitudinal axis between the biasing means and the needle valve, wherein the actuator amplifying lever is responsive to a dimensional change of the solid state actuator to permit movement of the needle valve from the first position to the second position.

28. The injector of claim 27, wherein the actuator amplifying lever comprises a first lever and a second lever positioned adjacent one another and mounted for pivotal movement about respective pivot points.

29. The injector of claim 28, wherein the pivot point of the first lever is positioned as spaced distance apart from the pivot point of the second lever, the respective pivot points positioned on opposite sides of the injector body.

30. The injector of claim 28, wherein each of the first and second levers further include a shim on the first end radially positioning each lever within the injector body.

31. The injector of claim 28, wherein each of the first and second levers have a first end for receiving a force from the solid state actuator and including an axle receiving bore at a second end, wherein each of the first and second levers also have a second end which is for transmitting a force to the needle valve, wherein the injector further comprises an axle extending through the axle receiving bores of each of the first lever and the second lever, and wherein the axle extends through the central longitudinal axis of the injector body.

32. The injector of claim 27, further comprising a lever base housed within the injector body, wherein the lever base and the actuator amplifying lever are integral and connected by a flexure fulcrum.

33. The injector of claim 27, further comprising a pusher pin contacting the actuator amplifying lever and transmitting the dimensional change of the solid state actuator to the actuator amplifying lever, wherein the pusher pin is offset and parallel to the longitudinal axis of the solid state actuator and wherein the angle between the longitudinal axis of the solid state actuator and the needle valve is acute.

34. The injector of claim 27, wherein the actuator amplifying lever is in compressive abutment between the needle valve and the control piston.

35. The injector of claim 27, wherein the control piston and needle valve are connected by a shaft and wherein the actuator amplifying lever includes a groove that receives the shaft.

36. The injector of claim 27, further comprising:

a pusher extending from the solid state actuator to one end of the actuator amplifying lever;

a plunger housing within the injector body which includes:

a plunger bore; and a pusher leg receiving bore;

a plunger axially moveable within the plunger bore and in contact with the actuator amplifying lever, wherein the pusher includes a pusher leg extending through the pusher leg receiving bore to establish contact with the actuator amplifying lever.

37. The injector of claim 36, further comprising a lever base housed within the injector body and extending between the plunger housing and the needle valve, wherein the plunger housing includes a fluid communication passageway extending from the plunger bore through the plunger housing and the lever base into fluid communication with the injection fluid outlet port, and wherein the solid state actuator includes a longitudinally extending internal bore in fluid communication with the injection fluid inlet port.

38. The injector of claim 27, wherein the longitudinal axis of the solid state actuator is substantially aligned with the axis of the needle valve.

39. A fluid injector comprising:

an injector body including an injection fluid inlet port and an injection fluid outlet port;

a solid state actuator housed within the injector body;

an actuator amplifying lever, including a first lever and a second lever, housed within the injector body, said first lever and said second lever being mounted for pivotal movement about respective pivot points; and a needle valve housed within the injector body and moveable between a first position closing the injection fluid outlet port and a second position to open the injection fluid outlet port, wherein the actuator amplifying lever is responsive to a dimensional change of the solid state actuator to permit movement of the needle valve from the first position to the second position.

40. The injector of claim 39, wherein the pivot point of the first lever is positioned a spaced distance apart from the pivot point of the second lever, the respective pivot points positioned on opposite sides of the injector body.

41. The injector of claim 39, wherein each of the first and second levers further include a shim on the first end radially positioning each lever within the injector body.

42. The injector of claim 39, wherein each of the first and second levers have a first end for receiving a force from the solid state actuator and including an axle receiving bore at a second end, wherein each of the first and second levers also have a second end which is for transmitting a force to the needle valve, wherein the injector further comprises an axle extending through axle receiving bores of each of the first lever and the second lever, wherein the axle extends through the central longitudinal axis of the injector body.

43. The injector of claim 39, further comprising a lever base housed within the injector body, wherein the lever base and the actuator amplifying lever are integral and connected by a flexure fulcrum.

44. The injector of claim 39, further comprising a pusher pin contacting the actuator amplifying lever and transmitting the dimensional change of the solid state actuator to the actuator amplifying lever, wherein the pusher pin is offset from and parallel to the longitudinal axis of the solid state actuator and wherein the angle between the longitudinal axis of the solid state actuator and the needle valve is acute.

45. The injector of claim 39, further comprising:

a control piston positioned in a control fluid chamber housed within the injector body; and a biasing means for biasing the control piston toward the actuator amplifying lever, wherein the control fluid chamber is in fluid communication with the control fluid inlet port.

46. The injector of claim 45, wherein the actuator amplifying lever is positioned in compressive abutment between the needle valve and the control piston.

47. The injector of claim 45, wherein the control piston and needle valve are connected by a shaft and wherein the actuator amplifying lever includes a groove that receives the shaft.

48. The injector of claim 39, further comprising:

a pusher extending from the solid state actuator to one end of the actuator amplifying lever;

a plunger housing within the injector body which includes:

a plunger bore; and a pusher leg receiving bore; and a plunger axially moveable within the plunger bore and in contact with the actuator amplifying lever, wherein the pusher includes a pusher leg extending through the pusher leg receiving bore to establish contact with the actuator amplifying lever.

49. The injector of claim 39, wherein the longitudinal axis of the solid state actuator is substantially aligned with the axis of the needle valve.

50. The injector of claim 39, wherein the solid state actuator includes a longitudinally extending internal bore which is in fluid communication with the injection fluid inlet port.

* * * * *